(12) United States Patent
Bauer et al.

(10) Patent No.: US 11,274,596 B2
(45) Date of Patent: Mar. 15, 2022

(54) COOLING AIR FEEDING APPARATUS FOR A MOTOR VEHICLE

(71) Applicant: Dr. Ing. h.c.F. Porsche Aktiengesellschaft, Stuttgart (DE)

(72) Inventors: Riccardo Bauer, Owen (DE); Tim Karner, Kornwestheim (DE); Tobias Posch, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/858,755

(22) Filed: Apr. 27, 2020

(65) Prior Publication Data

US 2020/0340392 A1 Oct. 29, 2020

(30) Foreign Application Priority Data

Apr. 29, 2019 (DE) ...................... 10 2019 110 955.8

(51) Int. Cl.
| | |
|---|---|
| *F02B 29/04* | (2006.01) |
| *F02M 35/10* | (2006.01) |
| *B60K 11/08* | (2006.01) |
| *B60H 1/30* | (2006.01) |
| *F01P 5/06* | (2006.01) |

(52) U.S. Cl.
CPC ........... *F02B 29/0431* (2013.01); *B60H 1/30* (2013.01); *B60K 11/08* (2013.01); *F01P 5/06* (2013.01); *F02B 29/0493* (2013.01); *F02M 35/10262* (2013.01); *F02M 35/10268* (2013.01)

(58) Field of Classification Search
CPC .............. F02B 29/0431; F02B 29/0493; F02B 29/0406; F02M 35/10262; F02M 35/10268; B60K 11/08; B60H 1/30; F01P 5/06

See application file for complete search history.

(56) References Cited

U.S. PATENT DOCUMENTS

| | | | |
|---|---|---|---|
| 5,120,105 A | 6/1992 | Brin et al. | |
| 2004/0041035 A1* | 3/2004 | Takei ...................... | F01P 7/167 236/34.5 |

(Continued)

FOREIGN PATENT DOCUMENTS

| | | |
|---|---|---|
| CH | 242075 A | 4/1946 |
| DE | 4009385 A1 | 9/1991 |

(Continued)

*Primary Examiner* — Jacob M Amick
(74) *Attorney, Agent, or Firm* — Leydig, Voit & Mayer, Ltd.

(57) ABSTRACT

A cooling air feeding apparatus is for a motor vehicle, which has a motor vehicle body and a drive train, the drive train being assigned a cooler, and at least the cooler being arranged in a rear region of the motor vehicle body. The cooling air feeding apparatus has a throughflow opening, which is in the rear region and which is configured to receive air from surroundings of the motor vehicle and to feed the received air to the cooler. In order to regulate a driving state of the motor vehicle, the throughflow opening is configured with a variable throughflow cross section with the aid of a closing element, which is assigned to the cooling air feeding apparatus. The throughflow opening is configured to be controllably closed individually completely or partially and to be opened completely.

10 Claims, 2 Drawing Sheets

(56) References Cited

U.S. PATENT DOCUMENTS

2013/0092462 A1* 4/2013 Chinta ................. B60K 11/085
    180/68.1
2016/0229285 A1    8/2016 Rutschmann et al.
2017/0361882 A1* 12/2017 Weber .................... B62D 37/02

FOREIGN PATENT DOCUMENTS

| DE | 102011000062 A1 | 7/2012 |
| DE | 102015101797 A1 | 8/2016 |
| GB | 2502963 A | 12/2013 |

* cited by examiner

COOLING AIR FEEDING APPARATUS FOR A MOTOR VEHICLE

CROSS-REFERENCE TO PRIOR APPLICATIONS

Priority is claimed to German Patent Application No. DE 10 2019 110 955.8, filed on Apr. 29, 2019, the entire disclosure of which is hereby incorporated by reference herein.

FIELD

The invention relates to a cooling air feeding apparatus for a motor vehicle.

BACKGROUND

Cooling air feeding apparatuses are used in motor vehicles. For instance, a motor vehicle with a drive unit that is arranged on the front region has what is known as a cooler grill, via which air is fed to an air cooler of the drive unit. An inlet opening of the cooling air feeding apparatus, via which inlet opening cooling air is fed to the air cooler, is also configured, in particular, on side walls of the motor vehicle body for motor vehicles which have a drive unit which is arranged in the rear.

A cooling air feeding apparatus for a motor vehicle is disclosed in patent specification GB 2502963 A, a cooler of the motor vehicle being arranged in a rear of a motor vehicle body of the motor vehicle. Inlet openings, via which air can be conducted to the cooler, are configured on side walls of the motor vehicle body for improved cooling of the cooler. Outlet openings are configured downstream of the cooler, it being possible for an outlet opening to be closed with the aid of an adjustable rear spoiler.

Laid-open specification DE 10 2011 000 062 A1 discloses a motor vehicle having a motor vehicle body, an internal combustion engine being arranged in the rear of the motor vehicle body. A cooling grill, via the grill openings of which air can flow onto the internal combustion engine, is configured in the rear in order to cool the internal combustion engine. In the case of an adjustment of a spoiler, which is arranged in the rear, further openings are configured, via which air can be fed to the internal combustion engine.

An intercooler which is received in the rear of a motor vehicle body for cooling air, which is to be sucked in by an internal combustion engine of the motor vehicle, is disclosed in laid-open specification DE 10 2015 101 797 A1. The internal combustion engine is received in a rear of the motor vehicle body. A movable spoiler is likewise configured on the rear. The intercooler is arranged above the internal combustion engine below a covering hood of the motor vehicle body. In order to cool the intercooler, an air guiding duct is configured, the inlet of which is configured between the spoiler and the covering hood, and the outlet of which is configured in a recess which receives a license plate. Although the inlet of the air guiding duct can therefore be covered, this can only take place in a manner which is dependent on a position of the spoiler. Furthermore, exclusively the inlet which is situated below the spoiler can be covered.

SUMMARY

An embodiment of the present invention provides a cooling air feeding apparatus that is for a motor vehicle, which has a motor vehicle body and a drive train, the drive train being assigned a cooler, and at least the cooler being arranged in a rear region of the motor vehicle body. The cooling air feeding apparatus has a throughflow opening, which is in the rear region and which is configured to receive air from surroundings of the motor vehicle and to feed the received air to the cooler. In order to regulate a driving state of the motor vehicle, the throughflow opening is configured with a variable throughflow cross section with the aid of a closing element, which is assigned to the cooling air feeding apparatus. The throughflow opening is configured to be controllably closed individually completely or partially and to be opened completely.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
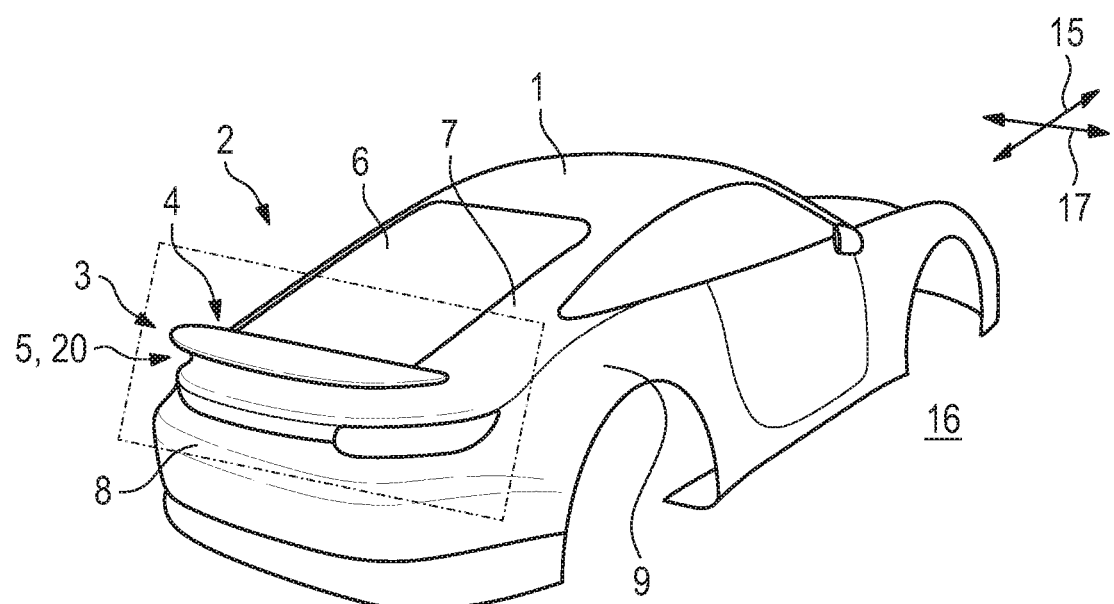
FIG. 1 shows a perspective illustration of a motor vehicle body having a cooling air feeding apparatus according to the invention.

Embodiments of the present invention provide an improved cooling air feeding apparatus for a motor vehicle.

A cooling air feeding apparatus according to an embodiment of the invention is provided for a motor vehicle. The motor vehicle includes a motor vehicle body and a drive train, the drive train being assigned a cooler. At least the cooler is arranged in a rear region of the motor vehicle body. The cooling air feeding apparatus has a throughflow opening, which is configured, in particular, in the rear region, and via which air from the surroundings can be fed to the cooler. According to an embodiment of the invention, in order to regulate a driving state of the motor vehicle, the throughflow opening is configured with a variable throughflow cross section with the aid of a closing element, which is assigned to the cooling air feeding apparatus, it being possible for the throughflow opening to be closed individually completely or partially and to be opened completely. The throughflow cross section is configured such that it can be closed completely and released completely, it being possible for numerous partially open cross sections, through which flow can pass, to be configured individually between the two states.

One advantage of the invention is an adaptation of a cooling air requirement of the cooler to its requirement. Coolers have an improved and more efficient cooling function if their external temperature is likewise sufficiently cool. As a result, heat losses through the walls are reduced substantially, as a result of which performance of the cooler can be increased as a consequence of an increase in its degree of efficiency. If the cooler can operate efficiently, a cooling medium that is cooled with the aid of the cooler is supplied in a cooler state to a corresponding unit, with the result that the latter can likewise be operated more efficiently and with an improved degree of efficiency.

An air quantity that flows onto and/or around the cooler can therefore be set with the aid of the change of the throughflow cross section of the throughflow opening. A thermodynamic state of the air quantity can likewise be set. In this way, even a small air quantity can have an advantageous speed that can be achieved, for example, with the aid of a small throughflow opening.

A further advantage is an influence of drag resistance of the motor vehicle. During operation of the motor vehicle, every open vehicle body opening can lead to an increase in the drag resistance in comparison with a closed vehicle body opening even at low speeds on account of air which flows in via the vehicle body opening. The drag resistance can therefore be influenced by way of the variable change of the throughflow cross section. In the case of a low cooling requirement of the cooler, in particular, the throughflow opening can be closed, in order that the proportion of the drag resistance that is initiated as a consequence of the open vehicle body opening is canceled.

A further advantage in the case of a closed throughflow opening is more rapid raising of an operating temperature of the unit, in particular a drive unit, in particular in the form of an internal combustion engine.

If the drive unit is to have a high power output, in particular in the case of full load, there is an increased performance requirement of the cooler that can be achieved with the aid of complete opening of the throughflow cross section.

A visual appearance of a closed motor vehicle body can be brought about, in particular with the aid of a closing element which can be positioned in a variable manner.

The throughflow cross section for air guidance to the cooler can be of variable configuration in different ways. For instance, the throughflow cross section would also be able to be set with the aid of an adjustable screen, similar to a visual screen. In order to change the throughflow cross section, it is advantageous, however, for a closing element to be configured in the form of a flap which can be pivoted about a rotational axis. A closing element that is configured in this way has a functionally reliable operation because jamming during the pivoting operation can be virtually ruled out.

In a further refinement of the cooling air feeding apparatus according to an embodiment of the invention, the closing element is of concavely curved configuration in the direction of the surroundings. A surface of the closing element that is configured so as to face the surroundings is curved in a concave manner. An additional pressure of the air that flows along the surface can be utilized in a manner that is dependent on a positioning of the cooling air feeding apparatus.

In order to bring about a reduced-weight cooling air feeding apparatus, the closing element has a carrier structure of at least partially hollow configuration with a covering element that extends over the carrier structure. Thus, for example, materials which have different densities can be utilized, in order that a cooling air feeding apparatus can be configured which is light, that is to say has a low weight. This can in turn lead to a reduction of an energy consumption of the drive unit, and a motor vehicle with reduced consumption and emissions can therefore be configured.

If the covering element is of textile nature, different visual effects can advantageously be produced. There is also the possibility of a simple and inexpensive replacement of the covering element for the possible individual adaptation of a visual appearance of the motor vehicle.

In a further refinement of the cooling air feeding apparatus according to an embodiment of the invention, the throughflow opening can be set with the aid of a regulating and control device of the motor vehicle, in particular in a manner which is dependent on a current vehicle state. By way of the regulating and control device, in particular, the operation of the drive unit is set in a manner that is dependent on what is known as an accelerator pedal. In this way, the throughflow cross section can already be set in a manner that is dependent on a desired speed before the speed is actually reached. Furthermore, algorithms can advantageously be stored in the regulating and control device in order that a throughflow cross section, which is adapted to the driving state of the motor vehicle, can be set. It is to be mentioned at this point that the term "accelerator pedal" represents all operating elements that are provided for speed regulation and can be operated by the driver of the motor vehicle.

If a setting of the throughflow cross section of the throughflow opening can be initiated mechanically and/or electrically and/or electronically, a short adjusting time can be realized, in particular, in the case of an electric and/or electronic initiation.

In a further refinement, the cooler is configured in the form of an intercooler. Customary drive units in the form of an internal combustion engine preferably have a supercharging unit, preferably in the form of an exhaust gas turbocharger, in order that more combustion air can be made available to the internal combustion engine than would be the case in an internal combustion engine which is configured as a naturally aspirated engine. A compression of the combustion air leads to the increase in a temperature of the air, however, which in turn would have the consequence of a reduction in the quantity. Therefore, an intercooler is arranged in an intake section of the internal combustion engine between the internal combustion engine and the supercharging unit. The closer the intercooler is arranged to the internal combustion engine, however, the greater in turn is a reduction in the combustion air quantity on account of a transmission of heat of the heat-emitting internal combustion engine. If the intercooler is arranged further away, the greater are likewise temperature increases on account of longer throughflow lines, which conduct the combustion air between the internal combustion engine and the intercooler. It is therefore advantageous to feed air to the cooler which is configured as an intercooler with the aid of the cooling air feeding apparatus, in order that the internal combustion engine can have a high power output. Otherwise, the air which is sucked in by a naturally aspirated engine can also be cooled with the aid of an intercooler, in particular at very high air temperatures, as a result of which an improved charge can be achieved.

Further advantages, features and details of the invention result from the following description of preferred exemplary embodiments and on the basis of the drawing. The features and combinations of features which are mentioned in the description above and the features and combinations of features which are mentioned in the description of the figures below and/or are shown solely in the figures can be used not only in the respective specified combination, but rather also in other combinations or on their own, without departing from the scope of the invention. Identical or functionally identical elements are assigned identical designations. It is possible for reasons of clarity that the elements are not provided with their designation in all the figures of the drawing, without losing their assignment, however.

Figure 2:
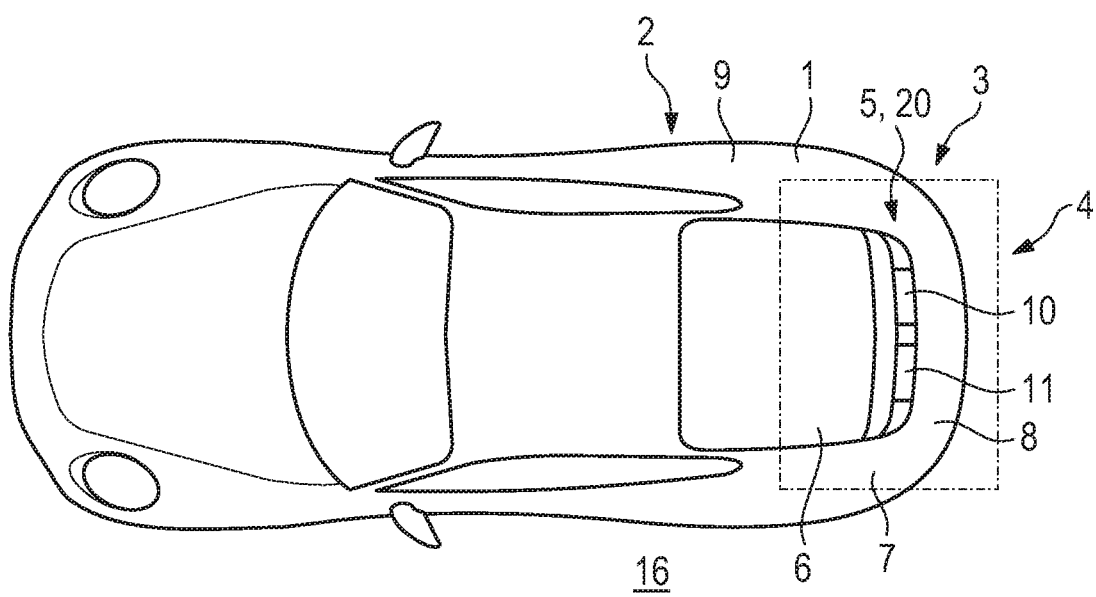
FIG. 2 shows a plan view of the motor vehicle body according to FIG. 1.

A motor vehicle body 1 (configured according to FIGS. 1 and 2) of a motor vehicle 2 has a cooling air feeding apparatus 4 according to the invention which is arranged in a rear region 3. The cooling air feeding apparatus 4 is received immovably on the motor vehicle body 1 and serves to cool air of a cooler 5 which is arranged in the rear region 3. The cooler 5 is usually cooled by way of the air stream during operation of the motor vehicle 2. In order to achieve a higher cooling performance of the cooler 5, it is advantageous to additionally feed cooling air to the cooler 5 at least for external cooling, with the result that its cooling performance is increased.

In the present exemplary embodiment, the cooler 5 is configured in the form of an intercooler. The cooler 5 might likewise be configured for cooling a drive unit, for example of an internal combustion engine or an electric motor or a battery. The abovementioned list is of course not exhaustive. In addition to the motor vehicle body 1, the motor vehicle 2 has a drive train 20 including the drive unit. The cooling air feeding apparatus 4 according to the invention can be provided for feeding cooling air to a very wide variety of components of the drive train 20; in this context, all of the components of the motor vehicle 2 that serve for an output of power can be assigned to the drive train 20. This likewise applies to how the intercooler is used here by way of example. The intercooler serves to cool combustion air that is to be fed to the internal combustion engine, and therefore serves for the power output of the internal combustion engine, and is assigned to the drive train 20 in this context.

In the rear region 3, the motor vehicle body 1 has a rear window 6, a rear hood 7 and an integrated bumper 8, which are arranged between side walls 9 of the motor vehicle body 1. Two throughflow openings, a first throughflow opening 10 and a second throughflow opening 11 of the cooling air feeding apparatus 4 according to the invention, are arranged in the motor vehicle body 1 between the rear window 6 and the rear hood 7. The throughflow openings 10, 11 might also be configured on the side walls 9, or one throughflow opening 10; 11 might be configured on one of the two side walls 9, and the other one of the two throughflow openings 11; 10 might be configured between the rear window 6 and the rear hood 7. Only a single throughflow opening or more than two throughflow openings might likewise also be configured.

Figure 3:
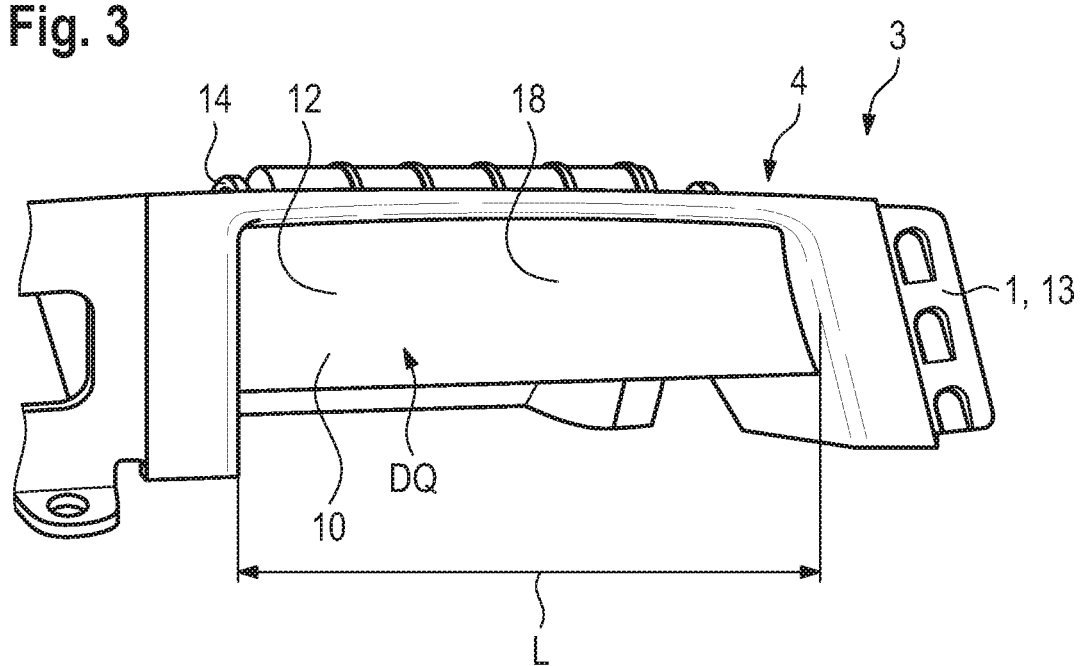
FIG. 3 shows a perspective view of the cooling air feeding apparatus according to the invention in a completely closed state.
Figure 4:
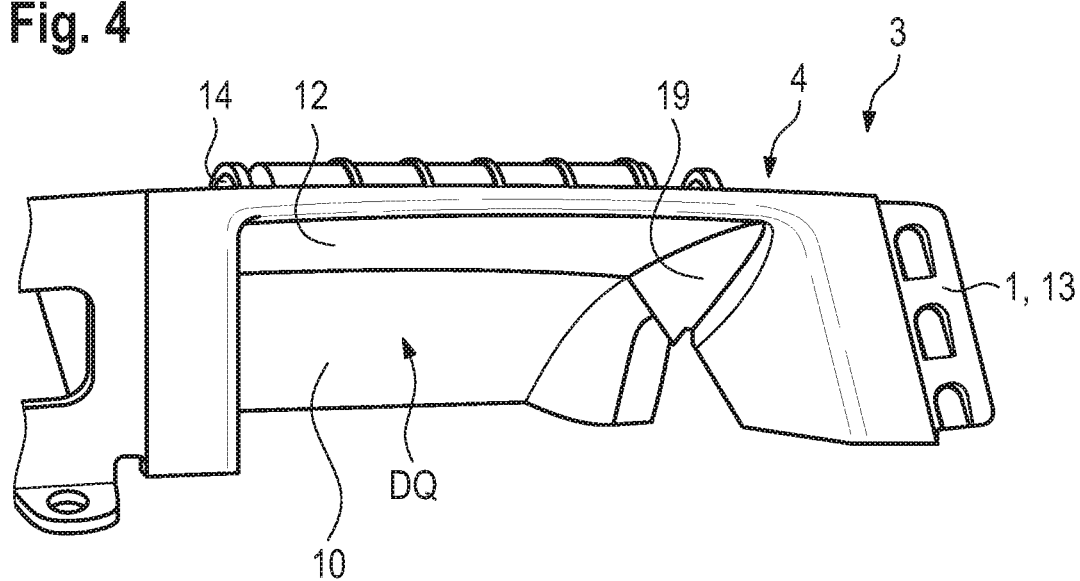
FIG. 4 shows a perspective view of the cooling air feeding apparatus in a completely open state.

FIGS. 3 and 4 illustrate the cooling air feeding apparatus 4 according to the invention in a completely closed state of the first throughflow opening 10 and in a completely open state of the first throughflow opening 10, respectively. In the following text, the description is directed at the first throughflow opening 10 which is of identical construction and configuration to the second throughflow opening 11, with the result that the description likewise relates to the second throughflow opening 11.

The throughflow opening 10 is configured with a variable throughflow cross section DQ. A closing element 12 which is received movably in a vehicle body component 13 which has the throughflow opening 10 is configured for changing the throughflow cross section DQ.

The closing element 12 is configured in the form of a flap, it being possible for the flap 12 to be pivoted about a rotational axis 14. In the present exemplary embodiment, the rotational axis 14 is configured so as to extend in the direction of a vehicle body transverse axis 17.

The flap 12 can be positioned in every further desired position between the two states which are shown in FIGS. 3 and 4. The advantage is that the cooling air feed can be adapted to a required cooling performance of the cooler 5. That is to say, a maximum cooling air feed can be achieved in the case of a maximum open position, whereas it is lower in the case of other positions of the flap 12.

In order to bring about flow benefits of an air flow which extends along a vehicle longitudinal axis 15 of the motor vehicle body 1, the flap 12 has a concavely curved covering surface 18 which is configured so as to face the surroundings 16.

In one exemplary embodiment, the flap 12 has a carrier structure, through which flow can pass and which is covered with the aid of a covering element in order to avoid throughflow. The covering element is produced from a preferably water-repellent textile. It might also be configured from any other textile, however.

In a further exemplary embodiment, the closing element 12 is of segment-like configuration. Here, the individual segments extend completely over a length L of the throughflow opening 10.

In order to increase the cooling performance of the cooler 5, the throughflow opening 10 is opened or closed as required in a manner which is dependent on a driving operation. That is to say, in other words, the throughflow opening 10 can also be open only partially, for example in part load operation. In full load operation in particular, in contrast, the throughflow opening 10 is open completely. In this way, an additional air mass flow onto the cooler 5 can be adapted to the operation of the corresponding unit as required.

A setting of the throughflow cross section DQ or, in other words, the positioning of the flap 12 can be initiated mechanically and/or electrically or electronically, the movement initiation being of electronic configuration in this exemplary embodiment. If, for example, the drive unit (here, the internal combustion engine) is operated in the full load range, a signal is sent to an actuator of a movement unit of the cooling air feeding apparatus 4, whereupon the flap 12 is moved in the corresponding direction and the throughflow opening 10 is opened completely. In the present exemplary embodiment, the actuator is part of the movement unit of the cooling air feeding apparatus 4 according to the invention, and is operatively connected to a coupling linkage of the drive unit, which coupling linkage is connected to the flap 12.

FIG. 4 shows the flap 12 in a maximum opening position, and therefore in a completely open state. In this exemplary embodiment, a side segment 19 of the flap 12 is provided, which side segment 19 covers regions of the throughflow opening 10 which are to be closed in accordance with the positioning of the flap 12. This can be necessary in the case of a non-rectangular or non-square outline of the throughflow opening 10, for example. The side segment 19 can be folded in, for example, in a manner which corresponds to the opening of the throughflow cross section DQ. More complex geometries of the throughflow opening 10 which are required, in particular, in order to bring about a desired design of the motor vehicle body 1 can thus be closed and opened simply.

In a further exemplary embodiment, the cooling air feeding apparatus 4 has a housing, in which the closing element 12 is mounted movably. The cooling air feeding apparatus 4 according to the invention can thus be produced inexpensively in a modular design for numerous motor vehicles 2, it being possible, however, for account to be taken only partially of the visual appearance of a vehicle body shape of the motor vehicle body 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF DESIGNATIONS

1 Motor vehicle body
2 Motor vehicle
3 Rear region
4 Cooling air feeding apparatus
5 Cooler
6 Rear window
7 Rear hood
8 Bumper
9 Side wall
10 First throughflow opening
11 Second throughflow opening
12 Closing element
13 Vehicle body component
14 Rotational axis
15 Vehicle body longitudinal axis
16 Surroundings
17 Vehicle body transverse axis
18 Covering surface
19 Side segment
20 Drive train
DQ Throughflow cross section
L Length

The invention claimed is:

1. A cooling air feeding apparatus for a motor vehicle, the motor vehicle comprising a motor vehicle body and a drive train, and the drive train being assigned a cooler, and at least the cooler being arranged in a rear region of the motor vehicle body, the cooling air feeding apparatus comprising:
 a throughflow opening, which is in the rear region and which is configured to receive air from surroundings of the motor vehicle and to feed the received air to the cooler,
 wherein in order to regulate a driving state of the motor vehicle, the throughflow opening is configured with a variable throughflow cross section with the aid of a closing element, which is assigned to the cooling air feeding apparatus,
 wherein the throughflow opening is configured to be controllably closed individually completely or partially and to be opened completely; and
 wherein the closing element consists of only one, single-piece flap that is pivotable about a rotational axis.

2. The cooling air feeding apparatus as claimed in claim 1, wherein the closing element has a concavely curved configuration in the direction of the surroundings.

3. The cooling air feeding apparatus as claimed in claim 1, wherein the closing element has a carrier structure of at least partially hollow configuration with a covering element that extends over the carrier structure.

4. The cooling air feeding apparatus as claimed in claim 3, wherein the covering element is a textile.

5. The cooling air feeding apparatus as claimed in claim 1, wherein the closing element has a segment configuration, with segments being configured so as to extend in a direction of a vehicle body transverse axis or in a direction of a vehicle body longitudinal axis.

6. The cooling air feeding apparatus as claimed claim 1, wherein the throughflow opening is settable with a regulating and control device of the motor vehicle in a manner which is dependent on a current vehicle state.

7. The cooling air feeding apparatus as claimed claim 1, wherein a setting of the throughflow cross section of the throughflow opening is configured to be initiated mechanically, electrically, or electronically.

8. The cooling air feeding apparatus as claimed in claim 1, wherein a drive unit comprising a coupling linkage is provided for setting the throughflow cross section of the throughflow opening.

9. The cooling air feeding apparatus as claimed in claim 1, wherein the cooler is an intercooler.

10. The cooling air feeding apparatus as claimed in claim 1, wherein the throughflow opening is settable with a regulating and control device of the motor vehicle in a manner which is dependent on a desired vehicle state prior to the motor vehicle reaching that desired vehicle state.

* * * * *